United States Patent [19]

Eickhoff et al.

[11] 4,131,169

[45] Dec. 26, 1978

[54] MOUNTING FOR TRACTION MEMBER WITH LATERAL STEP-DOWN TRANSMISSION

[75] Inventors: Jurgen Eickhoff, Tettnang; Bernhard Binger, Ravensburg, both of Germany

[73] Assignee: Zahnradfabrik Friedrichshafen Aktiengesellschaft, Friedrichshafen, Germany

[21] Appl. No.: 808,988

[22] Filed: Jun. 22, 1977

[30] Foreign Application Priority Data

Jun. 30, 1976 [DE] Fed. Rep. of Germany ....... 2629362

[51] Int. Cl.² ............................................. B62D 55/12
[52] U.S. Cl. ................................................. 180/9.62
[58] Field of Search ........................... 180/9.62, 70 R;
192/13 R; 74/801, 802

[56] References Cited

U.S. PATENT DOCUMENTS

| 2,702,603 | 2/1955 | Risk et al. | 180/9.62 |
| 3,978,935 | 9/1971 | Davwalder | 180/9.62 |
| 4,029,166 | 6/1977 | Haak et al. | 180/9.62 |

Primary Examiner—Richard A. Bertsch
Attorney, Agent, or Firm—Karl F. Ross

[57] ABSTRACT

A mounting for a vehicular traction member, such as an endless track, comprises a trunnion carried by means of two axially separated journal bearings on a hollow hub projecting from a vehicle frame, the hub being an extension of a transmission housing accommodating a planetary-gear train driven by a power shaft. An ancillary shaft coaxial with the power shaft, floatingly disposed within the hub, meshes at opposite ends with internal gear teeth of the trunnion and of a planet carrier forming part of the planetary-gear train, that planet carrier also driving a gear pump for the circulation of oil from a pump within the transmission housing across a space between the two journal bearings in which the oil is cooled through the trunnion wall.

10 Claims, 1 Drawing Figure

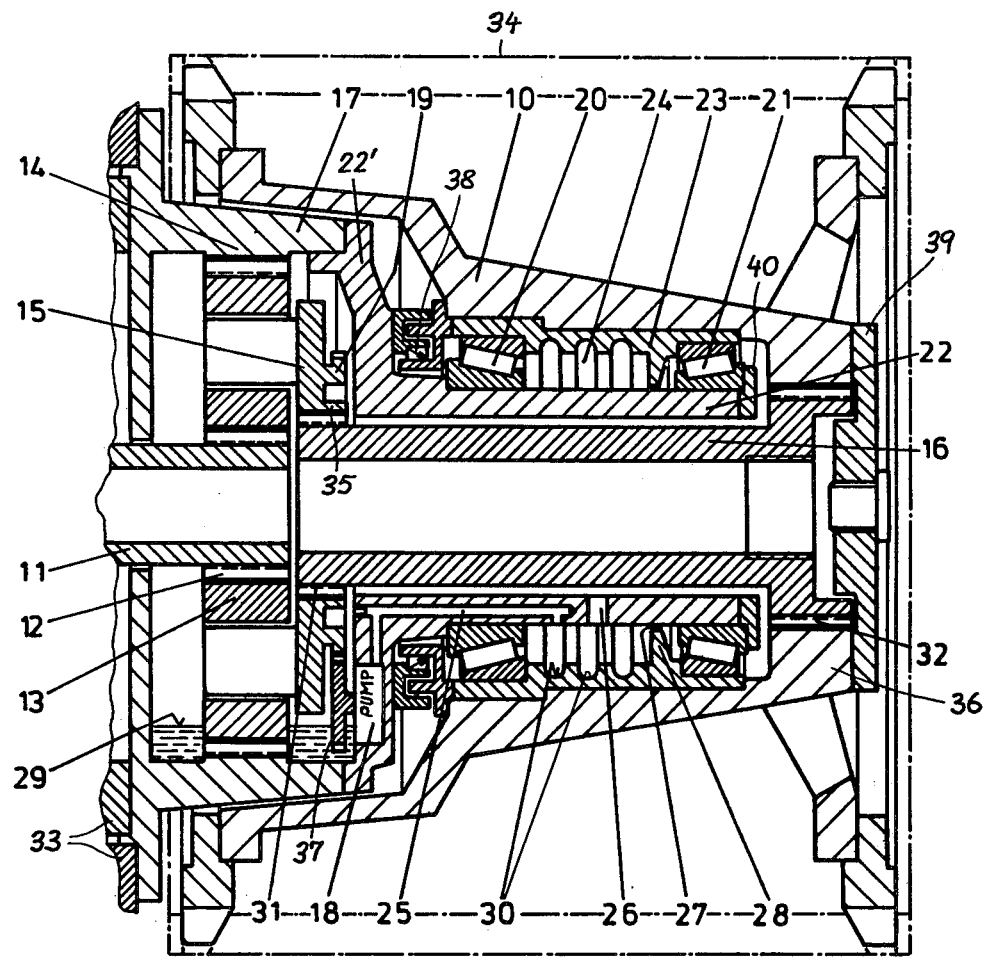

4,131,169

MOUNTING FOR TRACTION MEMBER WITH LATERAL STEP-DOWN TRANSMISSION

FIELD OF THE INVENTION

Our present invention relates to a mounting for a vehicular traction member, more particularly for an endless track — known as a caterpillar tread — of a utility vehicle or the like.

BACKGROUND OF THE INVENTION

In tractors and similar heavy-duty vehicles, such endless tracks are drivingly supported by sprocket drums which are set in rotation via step-down transmissions whose housings are part of the drum supports. With the transmission housing largely surrounded by the drum, from which it is separated by an air space, the heat generated in the transmission can be dissipated only to a minor extent through the exposed drum surface and must therefore be carried off mainly by the vehicle frame which is itself subjected to no inconsiderable heating by the engine and associated components. In such vehicles, accordingly, cooling of the oil used to lubricate the lateral transmissions of their track mountings presents a problem.

OBJECTS OF THE INVENTION

The general object of our present invention, therefore, is to provide means in such a vehicle for more effectively cooling a transmission in a housing forming part of a mounting for a sprocket drum or similar traction-member support driven through that transmission.

Another object is to provide a mounting of this description which can be easily disassembled and reassembled.

SUMMARY OF THE INVENTION

In accordance with our present invention, the traction-member support comprises a trunnion coaxially surrounding a hollow hub which forms a rigid extension of a lateral transmission housing; the trunnion is journaled on the hub by means of a pair of axially spaced bearings defining an annular clearance between them, that clearance being bounded by a thermally conductive wall of the trunnion. The annular clearance communicates with the interior of the transmission housing by way of conduits forming a closed path for the circulation of a lubricant, generally oil, which is impelled along that path by a pump within the housing operatively coupled with the transmission. Thus, the circulating lubricant is in heat-exchanging relationship with the surrounding atmosphere while passing through the annular space separating the trunnion from the hub.

Advantageously, according to a more particular feature of our invention, the return of lubricant from the annular clearance to the transmission housing takes place via one or more outlet ports all located radially inwardly of the thermally conductive trunnion wall whereby a quantity of lubricant is centrifugally retained, at least with higher operating speeds, in the vicinity of that trunnion wall for intensive cooling.

According to another feature of our invention, the transmission within the lateral housing is a planetary-gear train having the usual sun gear, planet carrier and ring gear, the sun gear being rigid with a power shaft centered on the trunnion axis. This planetary-gear train is operatively linked with the trunnion through an ancillary shaft which is coaxial with the power shaft and is floatingly received in the hollow hub. The ancillary shaft has two toothed extremities, one of them being in mesh with internal gear teeth on an annular flange of the planet carrier while the other meshes with internal gear teeth on a similar flange forming part of the trunnion. The planet carrier may be provided with a further set of gear teeth drivingly engaging the lubricant-circulating pump.

BRIEF DESCRIPTION OF THE DRAWING

The above and other features of our invention will now be described in detail with reference to the accompanying drawing the sole FIGURE of which is a sectional elevational view of a mounting for an endless track of a heavy-duty vehicle.

SPECIFIC DESCRIPTION

In the drawing we have shown part of a frame 33 of a tractor or similar vehicle fixedly supporting a lateral transmission housing 17, a pair of such lateral housings being provided on each side of the vehicle in association with two caterpillar treads of which one has been diagrammatically indicated at 34. Housing 17 has an extension 22 forming a hub for a trunnion 10 constituting one of two sprocket drums on which the treads 34 are drivingly supported, trunnion 10 being journaled on hub 22 through the intermediary of two axially spaced roller bearings 20 and 21. The outer races of these bearings are lodged in a sleeve 23 which is tightly fitted into trunnion 10 and forms with it a peripheral wall of good thermal conductivity. This wall and a confronting section of hub 22 are the outer and inner boundaries of an annular clearance or ring space 24 existing between journal bearings 20 and 21. Sleeve 23 is internally corrugated by having a plurality of annular grooves 30 cut into its inner peripheral surface to increase the effective area thereof.

A power shaft 11, driven by a nonillustrated vehicular engine through the usual gear-shifting system, projects axially into housing 17 and carries a sun gear 12 which forms part of a planetary-gear train acting as a step-down transmission. The planetary-gear train further comprises a ring gear 14 which is integral with housing 17 and meshes with a plurality of pinions 13 on a planet carrier 15; with ring gear 14 stationary, planet carrier 15 rotates at a fraction of the speed of power shaft 11. This planet carrier has an externally toothed flange 19 and an internally toothed flange 35, the latter meshing with a set of gear teeth 31 on an ancillary shaft 16 floatingly disposed in hub 22. Shaft 16, which is coaxial with shaft 11, is provided on its opposite extremity with another set of gear teeth 32 in meshing engagement with internal teeth on a front flange 36 of trunnion 10. Planet carrier 15, accordingly, is also floatingly mounted.

Transmission housing 17 formsan oil sump 29 in which that ring gear 14 is partly submerged, pinions 13 also entering that sump at the nadir of their orbit whereby the entire planetary-gear train is continuously lubricated. The teeth of flange 19 mesh with a driving pinion 37 of a gear pump 18 which dips into the sump 29 and propels the oil through an outgoing conduit 25 into the annular clearance 24 from which it returns to the sump by way of a port 26 and the space existing between shaft 16 and hub 22. The latter space also receives oil escaping from ring space 24 by way of roller bearing 21, such escape via the other roller bearing 20 being virtually prevented by a labyrinth seal 38. The two bearings 20 and 21, being oppositely inclined, also determine the axial position of trunnion 10 with reference to housing 17 and hub 22; these bearings are retained on the hub by a guard ring 40 secured to it with the aid of nonillustrated screws.

All outlets from ring space 24, including port 26 and an annular gap 27 between hub 22 and a barrier 28 ahead of bearing 21, lie radially inwardly from the corrugated outer periphery of that space. This insures that, at higher operating speeds, the oil entering the space 24 will accumulate along the grooved wall surface of sleeve 23 in an annular layer whose thickness increases with driving speed. The partial depletion of sump 29 at these higher velocities, aided by the more rapid operation of pump 18, has the further advantage of reducing the heat-generating effect of the periodic dipping of the planetary pinions 13 into the lubricant. The oil centrifugally retained in space 24 is, of course, continuously replaced by the influx of fresh lubricant from conduit 25.

The floatingly arranged planet carrier 15 and ancillary shaft 16 are kept practically free from bearing stresses and bending moments, thus having to transmit only the driving torque for trunnion 10. These elements can therefore be manufactured rather inexpensively and in such a manner as to be easily extracted from the housing for purposes of inspection or replacement. Thus, upon the removal of an end cap 39 from trunnion 10, shaft 16 can be withdrawn without necessitating a demounting of that trunnion, gear teeth 31 having a diameter which is less than the inner diameter of hub 22. Thereafter, guard ring 40 is accessible and can be detached to facilitate the removal of trunnion 10 and bearings 20, 21. Hub 22, bolted to housing 17 by a flange 22', can then also be taken off, followed by a disassembly of planetary-gear train 12–15 if desired.

We claim:

1. A mounting for a traction member of a vehicle provided with a frame and with an engine-driven power shaft, projecting laterally from said frame, comprising:
   a housing on said frame surrounding said power shaft;
   a hollow hub forming a rigid extension of said housing;
   a trunnion coaxially surrounding said hub;
   a pair of axially spaced journal bearings rotatably supporting said trunnion on said hub, said trunnion and said hub being separated by an annular clearance between said bearings;
   transmission means in said housing drivingly connecting said power shaft with said trunnion;
   conduit means forming a closed path for the circulation of a lubricant between said housing and said clearance; and
   pump means in said housing operatively coupled with said transmission means for circulating said lubricant along said path, said trunnion forming a thermally conductive wall around said clearance whereby the circulating lubricant is cooled upon passing through said clearance.

2. A mounting as defined in claim 1 wherein said clearance is provided with at least one outlet port for the return of lubricant to said housing, said outlet port being located radially inwardly of said wall whereby a quantity of lubricant is centrifugally retained in said clearance during rotation of said trunnion at high speeds.

3. A mounting as defined in claim 2 wherein said wall is internally corrugated.

4. A mounting as defined in claim 1 wherein said transmission means comprises an ancillary shaft coaxial with said power shaft floatingly received in said hub.

5. A mounting as defined in claim 4 wherein said transmission means further comprises a planetary-gear train with a sun gear rigid with said power shaft, a ring gear integral with said housing, and a carrier for a pinion meshing with said sun and ring gears, said carrier being provided with a first annular flange having internal gear teeth in mesh with a first toothed extremity of said ancillary shaft, said trunnion being provided with a second annular flange having internal gear teeth in mesh with a second toothed extremity of said ancillary shaft.

6. A mounting as defined in claim 5 wherein said carrier is provided with a further set of gear teeth drivingly engaging said pump means.

7. A mounting as defined in claim 6 wherein said lubricant is oil forming a sump at the bottom of said housing, said ring gear being partly submerged in said sump.

8. A mounting as defined in claim 7 wherein said pump means comprises a gear pump dipping into said sump.

9. A mounting as defined in claim 5 wherein said first toothed extremity has a smaller diameter than the interior of said hub to facilitate extraction of said ancillary shaft.

10. A mounting as defined in claim 1 wherein said trunnion is provided with sprocket teeth for the entrainment of an endless track.

* * * * *